(12) United States Patent
Hong et al.

(10) Patent No.: US 12,451,160 B2
(45) Date of Patent: Oct. 21, 2025

(54) METHOD FOR READING AND WRITING FRAME IMAGES WITH MULTIPLE BUFFER BLOCKS AND SYSTEM

(71) Applicant: REALTEK SEMICONDUCTOR CORP., Hsinchu (TW)

(72) Inventors: Shi-Xuan Hong, Hsinchu (TW); Huan-Wen Chen, Hsinchu (TW); Po-Hsien Wu, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 93 days.

(21) Appl. No.: 18/433,609

(22) Filed: Feb. 6, 2024

(65) Prior Publication Data

US 2024/0274155 A1    Aug. 15, 2024

(30) Foreign Application Priority Data

Feb. 9, 2023    (TW) ................. 112104505

(51) Int. Cl.

| | |
|---|---|
| *G11B 27/00* | (2006.01) |
| *G11B 20/10* | (2006.01) |
| *G11B 27/10* | (2006.01) |
| *G11B 27/36* | (2006.01) |
| *H04N 7/01* | (2006.01) |
| *G11B 23/00* | (2006.01) |
| *G11B 23/02* | (2006.01) |

(52) U.S. Cl.
CPC ...... *G11B 20/10527* (2013.01); *G11B 27/005* (2013.01); *G11B 27/36* (2013.01); *H04N 7/0127* (2013.01)

(58) Field of Classification Search
CPC ......... G11B 27/00; G11B 27/10; G11B 23/00; G11B 23/02
USPC ................. 386/295, 291, 294, 292, 248, 239
See application file for complete search history.

(56) References Cited

U.S. PATENT DOCUMENTS

| | | | |
|---|---|---|---|
| 5,103,467 A  * | 4/1992 | Bedlek ................. | H04J 3/0626 375/371 |
| 2006/0171658 A1* | 8/2006 | Jochemsen ........ | H04N 21/4147 348/E5.007 |

* cited by examiner

*Primary Examiner* — Daquan Zhao
(74) *Attorney, Agent, or Firm* — Li & Cai Intellectual Property (USA) Office (57) ABSTRACT

A method for reading and writing frame images with multiple buffer blocks and a system are provided. In the system, when an input-fast mode is switched to an input-low mode, a read end decides whether to read a next buffer block according to a writing progress. If a write end does not change the buffer block to be written, the read end keeps reading the buffer block, and otherwise the read end selects a next buffer block to be read. In an instance that the read end is required to read the same frame image repeatedly, when the input-slow mode is switched to the input-fast mode, the write end decides whether to write a next buffer block according to a reading progress. The write end selects a next buffer block to be written with a next frame image if the read end already reads last buffer block.

20 Claims, 9 Drawing Sheets

METHOD FOR READING AND WRITING FRAME IMAGES WITH MULTIPLE BUFFER BLOCKS AND SYSTEM

CROSS-REFERENCE TO RELATED PATENT APPLICATION

This application claims the benefit of priority to Taiwan Patent Application No. 112104505, filed on Feb. 9, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a technology of frame buffering, and more particularly to a method and a system for controlling multiple buffer blocks to access the frames when the frame rate is not a constant.

BACKGROUND OF THE DISCLOSURE

A video device or an image processor relies on a video format and technical requirement such as a refresh rate or a frame rate for displaying a video at an output end in order to process frame rate control (FRC) on the video. The video can be properly outputted when the output end matches an input end. In the process of frame rate control, the video is frame-by-frame stored into a buffer. In general, under a condition of a constant input and output data rate, an output frame rate conversion is in process via a limited buffer. When multiple buffer blocks are provided for accessing the frame images, the frame rate control for writing and reading different buffer blocks can be divided into an input fast mode and an input slow mode.

Figure 1:
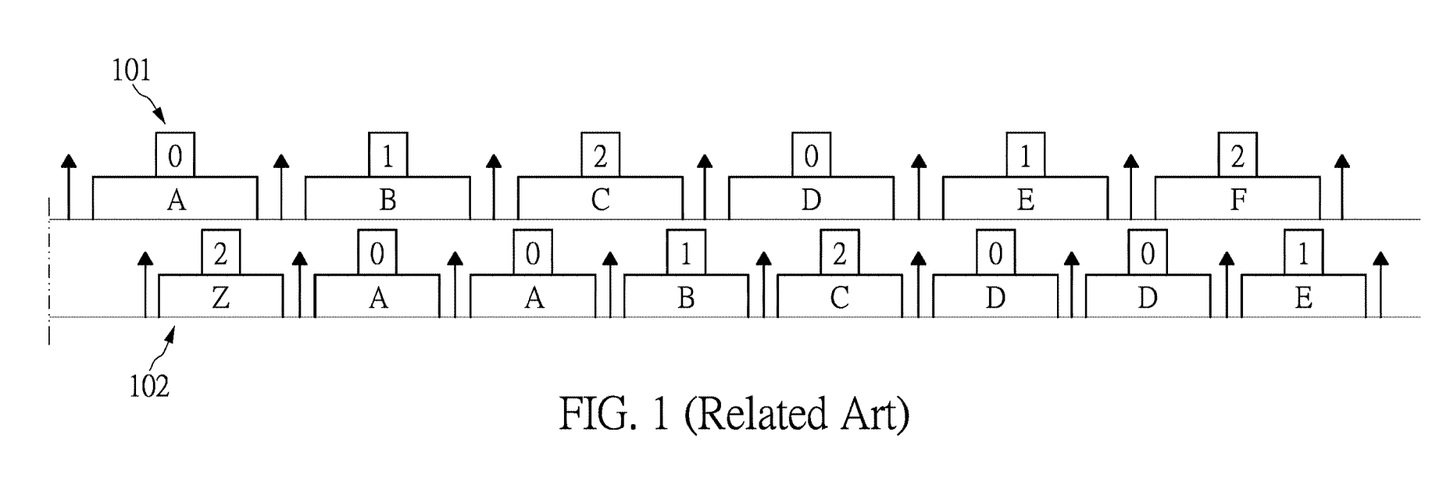
FIG. 1 is a timing diagram illustrating a conventional time sequence of frame-by-frame writing frames to multiple buffer blocks under an input slow mode.

FIG. 1 is a timing diagram showing a time sequence for frame-by-frame storing a video to multiple buffer blocks under the input slow mode. Input slow mode indicates that a speed of frame-by-frame writing a video into a write buffer is slower than the speed of reading out the data. A control mechanism of the audiovisual system is provided to drive a circuit of the write end to select the write buffer blocks to be written based on a fixed order. Further, a circuit of the read end is driven to select the buffer blocks to be read according to buffer index at the write end. Thus, the problem of writing and reading the same buffer block at the same time can be avoided.

A write timing 101 and a read timing 102 are shown in the diagram. The upward arrows shown in the two timing lines (101, 102) indicate the vertical sync (v sync) signals for a process of frame-by-frame writing to a write buffer. When an image-processing circuit or a software sequence completely writes a frame image, a vertical sync signal is generated. Thus, a period of time between the two upward arrows indicates timing for writing a frame image. The above-mentioned input slow mode indicates that, as shown in FIG. 1, a time for writing a frame image in the write timing 101 is larger than a time for reading the frame image in the read timing 102.

FIG. 1 is a schematic diagram depicting a video consisting of a plurality of frames that are written and read by the system and are labeled with the symbols A, B, C, D, E, F and Z. The numerical numbers 0, 1 and 2 are indicative of multiple buffer blocks. In the present example, the write timing 101 indicates that the instructions generated by hardware or software in the system are configured to sequentially write the frame A, the frame B, the frame C, the frame D, the frame E and the frame F into the buffer blocks 0, 1 and 2. In the meantime, the read timing 102 indicates that a write instruction is used to determine whether or not each of the buffer blocks is written according to the buffer index for the buffer blocks. The system can rely on the buffer index for the buffer blocks to select the buffer block to be read. Under an input slow mode, in the read timing 102 of the present example, the frame Z being written in the buffer block 2 is read firstly, and next the frame A being written in the buffer block 0 is read.

In the meantime, because of the input slow mode, after the frame A in the buffer block 0 is read, the data is not completely written to the buffer block 1. Under the frame rate control, the frame A in the buffer block 0 will be read repeatedly, and afterwards the frame B in the buffer block 1 is then read. During the period of time when the frame B in the buffer block 1 is read, the frame C is written to the buffer block 2 completely, and then the frame C in the buffer block 2 can be read. After that, the frame D in the buffer block 0 is read. Under the input slow mode, the frame D in the buffer block 0 is repeatedly read since the frame E is not yet written to the buffer block 1 completely. Afterwards, the frame E is read from the buffer block 1.

Figure 2:
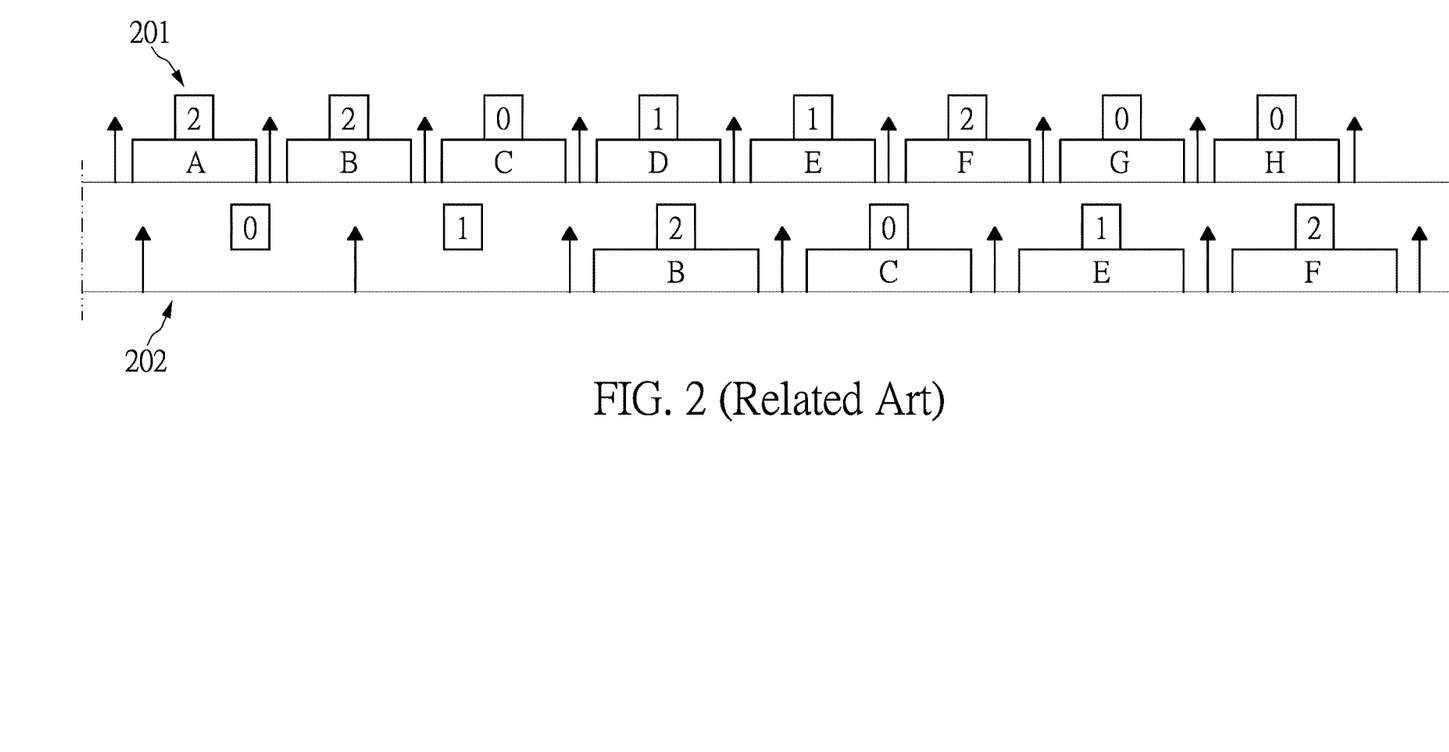
FIG. 2 is a timing diagram illustrating a conventional time sequence of frame-by-frame writing frames to multiple buffer blocks under an input fast mode.

FIG. 2 next shows a timing diagram illustrating the time sequence of frame-by-frame storing a video into a plurality of buffer blocks under an input fast mode. The input fast mode means a write rate is higher than a read rate. In the timing diagram, a time interval between the two adjacent vertical sync signals in the writing timing 201 is shorter than another time interval between the two vertical sync signals in the read timing 202. That means that the time for writing a frame image is shorter than the time for reading a frame image in the read timing 202.

In the system that adopts the multiple buffer blocks, a circuit of the read end selects the buffer block to be read in a fixed order. As shown in the diagram, at the read end, a read instruction is generated by a software program or a circuit for sequentially reading the frame images from the buffer blocks 0, 1 and 2. The frame images are such as the frames B, C, E and F shown in the diagram. A circuit of the write end selects the buffer block to be written according a buffer index of the read end so as to avoid reading and writing to the same buffer block at the same time.

In the timing diagram, in the write timing 201, a write instruction is generated for selecting the buffer block to be written according to a buffer index of the read end. The present example shows that, according to an order, a frame A is written to the buffer block 2, a frame B is written to the buffer block 2, a frame C is written to the buffer block 0, a frame D is written to the buffer block 1, a frame E is written to the buffer block 1, a frame F is written to the buffer block 2, a frame G is written to the buffer block 0, and a frame H is written to the buffer block 0. In the meantime, in the read timing 202, no data in the buffer blocks 0 and 1 can be read in the beginning. After that, the frame B is read from the buffer block 2 since the frame B has been written to the buffer block 2, and the frame C is read from the buffer block 0. Next, when the data in the next buffer block 1 is read, only frame E can be read based on the input fast mode. Afterwards, the frame F is read from the buffer block 2. A frame drop problem occurs at this moment.

Figure 3:
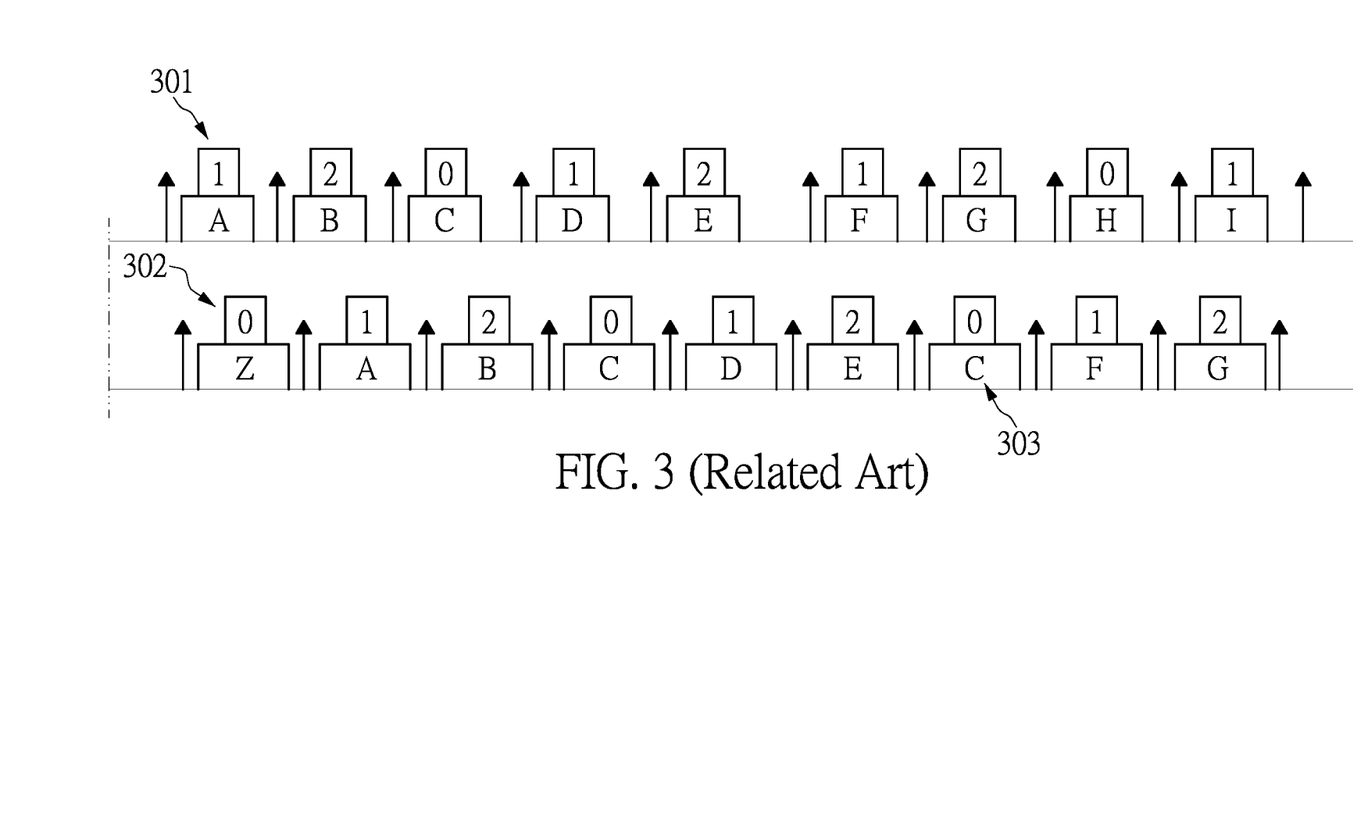
FIG. 3 is a timing diagram illustrating a conventional time sequence of frame-by-frame writing frames to multiple buffer blocks with a variable data rate.

Reference is made to FIG. 3, which is a timing diagram illustrating a time sequence of frame-by-frame storing the frames into the multiple buffer blocks based on a variable frame rate.

With the input fast mode as an example, in a read timing 302, the frame images can be read from the buffer block 0, 1 and 2 sequentially. A circuit of the write end selects the buffer block to be written with the data according to a buffer index of the read end. In a write timing 301, the frames A, B, C, . . . and I are sequentially written into the buffer blocks, in which the read end selects the buffer blocks to be read according to the buffer index of the read end.

The write end relies on the buffer index of the read end to select the buffer block to be written with the data under the input fast mode. Therefore, when the circuit of the write end selects the buffer block to be written with the data, the circuit may skip the buffer block that is read by the circuit of the read end, so that this buffer block may not be refreshed. Further, a new frame image may be written to a next buffer block being selected. Therefore, the read end may read the data that is not yet refreshed when reading the buffer block. That means that a jump-back phenomena occurs since the data that is not refreshed will be read repeatedly.

In the exemplary example shown in FIG. 3, in the read timing 302, when the circuit of read end read the frame E from the buffer block 2, the next frame F should be read sequentially. However, the frame C in the buffer block 0 that is not yet refreshed and should be read next may be retained in the buffer block 0 due to the above reason. Therefore, the jump-back frame 303 in the diagram is produced because the frame C is read again.

Figure 4:
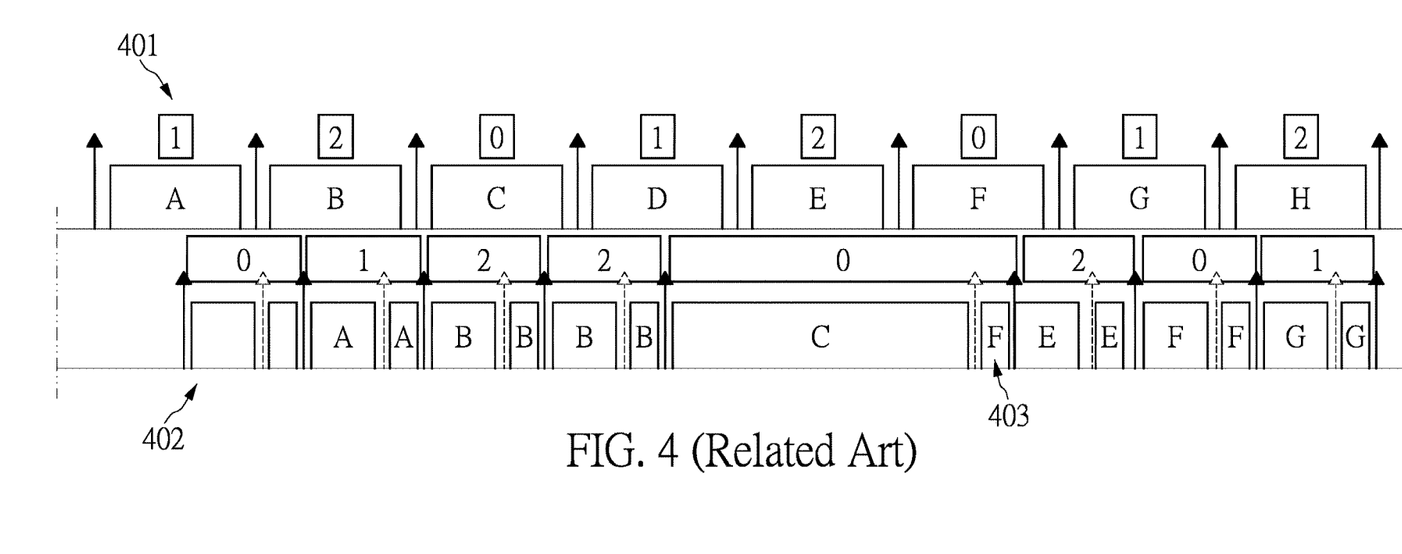
FIG. 4 is a timing diagram illustrating a conventional time sequence of repeatedly delivering a same frame but occurring that the previous frame is inconsistent with the following frame.

Further, FIG. 4 shows another problem that a previous frame image is inconsistent with a following frame when it is required to read the same frame again. The timing diagram shown in FIG. 4 is originally under the input slow mode. Under the input slow mode, a rate of reading each of the frames is greater that a rate of writing. In the write timing 401, the circuit of the write end sequentially writes the frames A, B, C, D, E, F, G and H to the buffer blocks 0, 1 and 2 according to an instruction. In the read timing 402, the circuit of read end selects the buffer block to be read according to a buffer index.

In the read timing 402, in the beginner, the circuit of the read end reads a specific frame from a buffer block 0. Next, frame A that has been written to a buffer block 1 can be read from the buffer block 1. An instruction of frame rate control is configured to require transmitting a same frame repeatedly. Therefore, the frame A is required to be read again during the frame A is read. The intermediate dotted arrows shown on the timing line indicate the vertical sync signals that are configured to require repeatedly reading the same frame. Similarly, the frame B is read from the buffer block 2 and the frame B is required to be read from the buffer block 2 at a next timing.

Next, when the circuit of the read end reads the frame C from the buffer block 0, an instruction is generated for requiring repeatedly reading the frame C from the buffer block 0 during the frame C is read from the buffer block 0. If an output rate at the read end slows down randomly, the following frame may be inconsistent with the previous frame (including an error frame 403) even if it is required to read the same frame since the timing at the read end becomes slower. For example, when reading the data from the buffer block 0, the circuit of the write end sequentially writes the frame D to the buffer block 1, writes the frame E to the buffer block 2, and writes the frame F to the buffer block 0. However, the following frame is inconsistent with the previous frame because, during the timing for reading the frame C from the buffer block 0, it is required to repeated read the data in the buffer block 0, but, rather the frame C, the buffer block 0 already stores the frame F.

Thus, if an input rate and an output rate of the system are not constant, that means the refresh rate can be changed, the conventional frame rate control may cause a problem that the frame image jumps back or a previous frame is different from a following frame if the same frame is required to be repeated. The problem may cause poor viewing experience for users.

For example, if an application outputs the content with an output rate of 60 frames per second, the output and the input may be out of sync if the frame rate drops to 40 frames per second in a specific condition. Accordingly, the phenomena of jump-back or the problem of inconsistent frames occurs.

SUMMARY OF THE DISCLOSURE

When an image-processing circuit or a software program is used to process an input video, some problems of jump-back frames or repeated frames may occur under frame rate control due to an unstable input and output data rate. In response to the above-referenced technical inadequacies, the present disclosure provides a method for reading and writing frame images with multiple buffer blocks and a system thereof. In the method, the above-mentioned problems such as the jump-back frames, the repeated frames or other special requirements can be solved by providing some selection strategies for accessing the buffer blocks of a write end and a read end.

The system performing the method includes a video-processing system having the write end and the read end having the multiple buffer blocks.

In the method for reading and writing frame images with multiple buffer blocks, when accessing the frame images in the multiple buffer blocks, a mechanism of frame rate control that is configured to read and write the different buffer blocks can be divided into an input fast mode and an input slow mode. Both the input fast mode and the input slow mode have their certain operating methods in the conventional frame rate control mechanism. According to certain embodiments of the present disclosure, in the video-processing system, the write end and the read end are implemented by a circuitry or software, and the write end and the read end respectively connect with a memory that implements the multiple buffer blocks.

In an aspect of the method for reading and writing frame images with multiple buffer blocks of the present disclosure, when the input fast mode is switched to the input slow mode, the read end determines whether or not to read a next buffer block based on a progress of writing data into the multiple buffer blocks of the write end. If the write end does not change the buffer block to be written, the read end is kept on the buffer block that is currently read. If it is detected that the write end changes the buffer block to be written, in the meantime the read end selects the next buffer block to be read.

On the other hand, in an operation of asking the read end to read a same frame image repeatedly, if the input slow mode is switched to the input fast mode, the write end determines whether or not to write to a next buffer block based on a progress of the read end reading the multiple buffer blocks. If the read end does not read the last buffer block to be repeated, the write end continuously checks the progress of the read end reading the multiple buffer blocks. The write end selects a next buffer block to write the frame image if the read end has read the last buffer block to be repeated.

Further, when the video-processing system acknowledges that an audiovisual source of a video adopts a variable refresh rate, a problem of jump-back frames is detected when the input fast mode is switched to the input slow mode due to the refresh rate is not a constant.

In another situation, when the video-processing system requires the read end to read the same frame image repeatedly, a problem of a previous frame is different from a following frame even if the system requires to output the same frame repeatedly is formed if the input slow mode is suddenly switched to the input fast mode due to a read rate of the read end drops suddenly.

Preferably, the progress of accessing the multiple buffer blocks of the write end or the read end can be determined according to the buffer index with respect to the read end the write end. Alternatively, the progress of accessing the multiple buffer blocks of the write end or the read can be determined by the vertical sync signals of the write end or the read end.

In an aspect of the present disclosure, the video-processing system can control the read end to repeatedly read the same frame image with multiple times through the vertical sync signals.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

For an audiovisual data with a variable refresh rate (VRR) from a specific audiovisual source, an image-processing circuit or a software program of a device that processes a video is required to perform frame rate control (FRC) in order to make an input video to match an output requirement. Further, for preventing a problem of jump-back frames due to a fresh rate is not a constant that affects a frame rate or another problem that a previous frame is different from a following frame even if a same frame is required to be repeated due to random changes in read/write rates, provided in the present disclosure is related to a method for reading and writing frame images with multiple buffer blocks and a system that performs the method.

Figure 5:
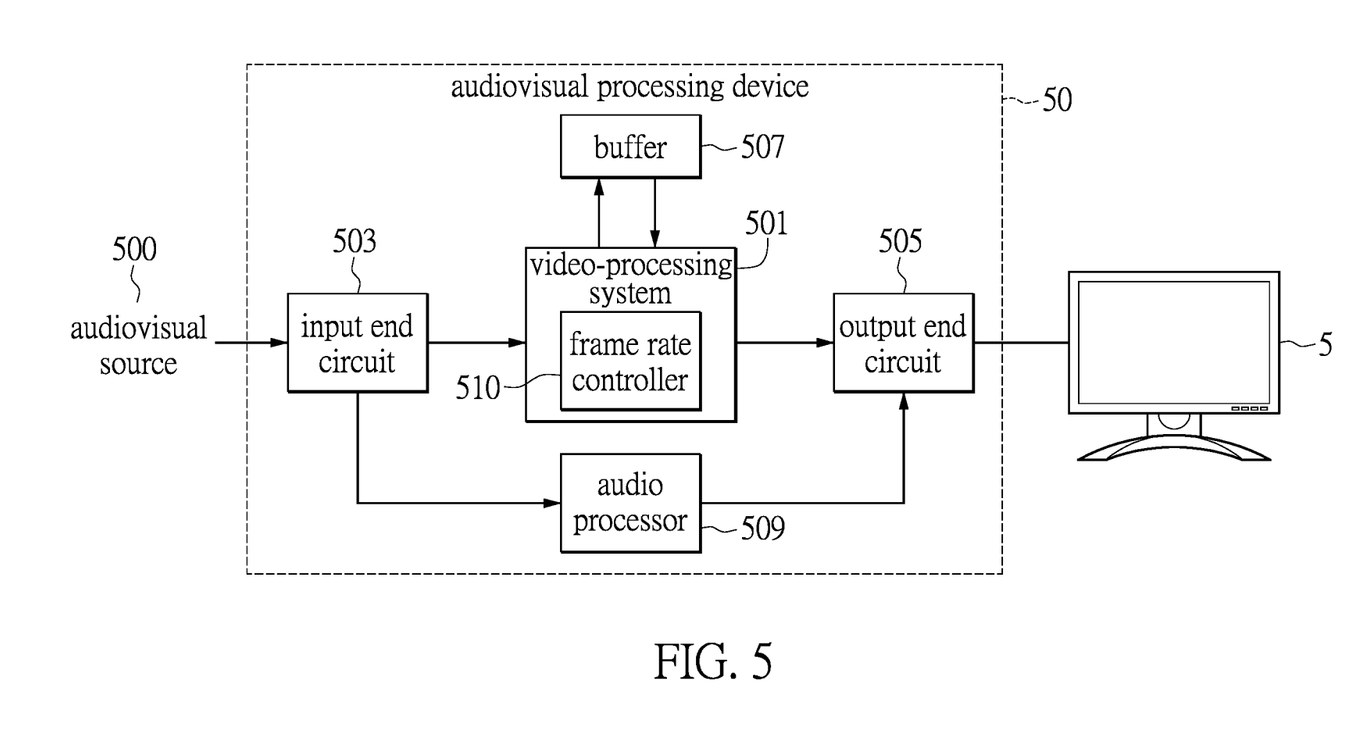
FIG. 5 is a schematic diagram illustrating a system that operates a method for reading and writing frame images with multiple buffer blocks according to one embodiment of the present disclosure.

According to one embodiment of the system that operates the method for reading and writing frame images with multiple buffer blocks, reference is made to FIG. 5, which is a schematic diagram depicting the system. The system can be a hardware-implemented (e.g., a system-on-ship (SoC)) or software-implemented video-processing system. The video-processing system can be adapted to a device that can provide multiple buffer blocks.

An audiovisual processing device 50 that receives audiovisual data from an audiovisual source 500 is provided. The audiovisual processing device 50 includes circuit systems that process the video signals and the audio signals respectively. According to certain embodiments of the present disclosure, the circuit systems are such as a video-processing system 501 that performs the method for reading and writing frame images with multiple buffer blocks and an audio processor 509 that processes the audio signals. The video-processing system 501 includes a frame rate controller (FRC) 510 that, by a circuit or software, controls operations of writing and reading each of the frame images of the video into a buffer 507 and performs frame rate conversion. The implementation of the video-processing system 501 can be an image-processing card, a set-top box or the like, and can also be a software method running in a system-on-chip (SoC).

The audiovisual processing device 50 includes an input end circuit 503 and an output end circuit 505. The audiovisual processing device 50 receives an audiovisual data transmitted from the audiovisual source 500 via the input end circuit 503. The video portion of the audiovisual data is provided to the video-processing system 501, and the audio portion of the audiovisual data is provided to the audio processor 509. After the audiovisual data is completely processed, the processed data is outputted to an audiovisual terminal 5 via the output end circuit 505.

The video-processing system 501 of the audiovisual processing device 50 provides a write function at a write end and a read function at a read end that are implemented by a circuitry or software. The write end and the read end of the video-processing system 501 can be electrically connected to a buffer 507 that can be implemented by a memory connected to or built in the video-processing system 501 of the audiovisual processing device 50. The buffer 507 is configured to have multiple buffer blocks. The video-processing system 501 operates the method for reading and writing frame images with multiple buffer blocks through the frame rate controller 510. Specification of an input video should be matched with the requirements such as a refresh rate or a frame rate at the output end. Under a condition of using the multiple buffer blocks to access the frame images, the frame rate control configured to write and read the different buffer blocks can be divided into two modes such as an input fast mode and an input slow mode. Under the input fast mode, the write end needs to wait for the reading operation of the read end. The write end relies on a buffer index of the read end that acts as a master to select the buffer block to be written. Under the input slow mode, the read end relies on a buffer index of the write end that acts as a master to select the buffer block to be read. The buffer indexes can be stored to a memory such as a DDR or a SRAM of the system by means of software or hardware, and can be used to determine a progress of accessing the buffer 507 having the multiple buffer blocks of both the write end and the read end.

Figure 6:
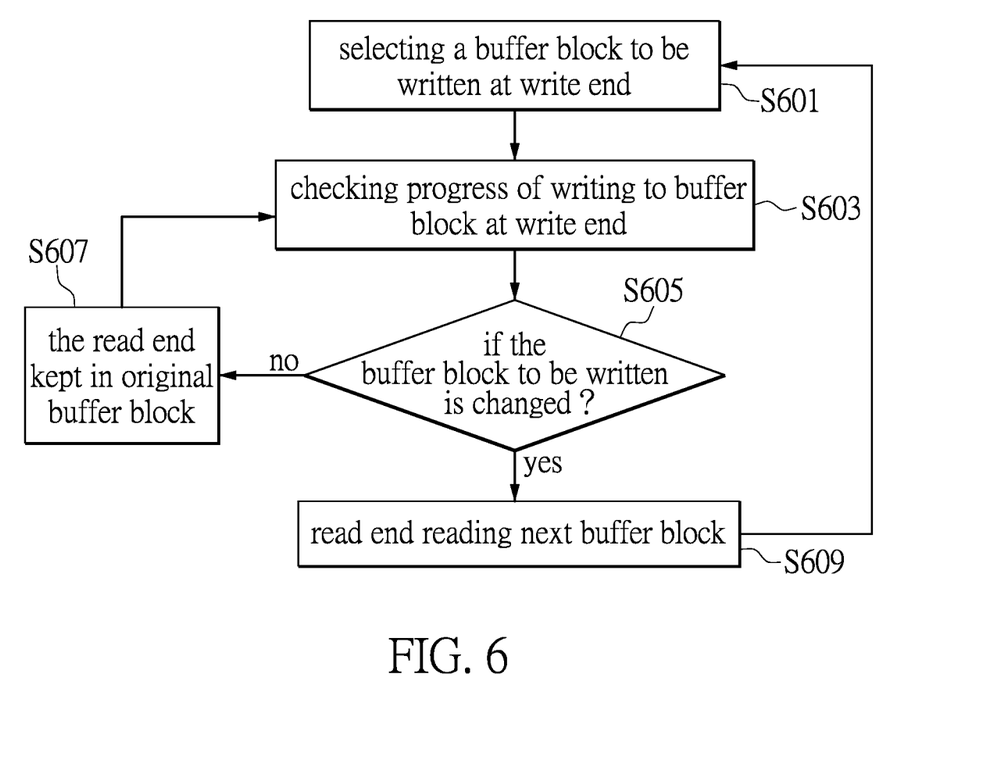
FIG. 6 is a flowchart illustrating the method for reading and writing frame images with multiple buffer blocks according to a first embodiment of the present disclosure.

FIG. 6 is a flowchart illustrating an action of controlling the read end to read according to a progress of writing data into a write buffer at the write end according to one embodiment of the present disclosure. The process of controlling operation of the read end is to solve the problem of jump-back frames shown in FIG. 3 especially when the input fast mode is suddenly switched to the input slow mode. For example, when the video-processing system acknowledges that an audiovisual source of a video adopts a variable refresh rate, a problem of jump-back frames may be produced since the variable refresh rate may result in switching the input fast mode of the system to the input slow mode.

A plurality of continuously-received frame images of a video can be sequentially written to the multiple buffer blocks of the write end of the video-processing system. At this time, the write end acts as a master that can sequentially write the frame images into the multiple buffer blocks, or the frame images are written to the multiple buffer blocks based on a specific rule (step S601). At the read end, the video-processing system checks a progress of writing the frames into the buffer blocks of the write end (step S603). It is mainly to check whether or not any new frame image is written to the buffer blocks. According to one embodiment of the present disclosure, the progress of writing the frames into the buffer blocks can be determined by checking a buffer index, or checking the change of the vertical sync signals at the write end. The read end can rely on a check result to perform a reading operation, as the process shown in step S605, so as to determine whether or not the write end changes the buffer block to be written.

If a check result shows that the write end is still writing data to a specific buffer block, which means that the buffer block to be written is not changed (no), the read end can be kept at the buffer block that is currently working on reading for preventing the above-mentioned problem of jump back of frame (step S607). In the meantime, the writing progress of the write end is continuously checked (step S603). Otherwise, if it is checked that the write end has changed the buffer block to be written, it shows that the frame images are completely written to the previous buffer block (yes), and the read end can switch the previous buffer block to be read to reading a next buffer block (step S609). This flow then goes back to the previous step S601 and goes on selecting the buffer block of the write end or sequentially writing the data to the buffer block.

Figure 7:
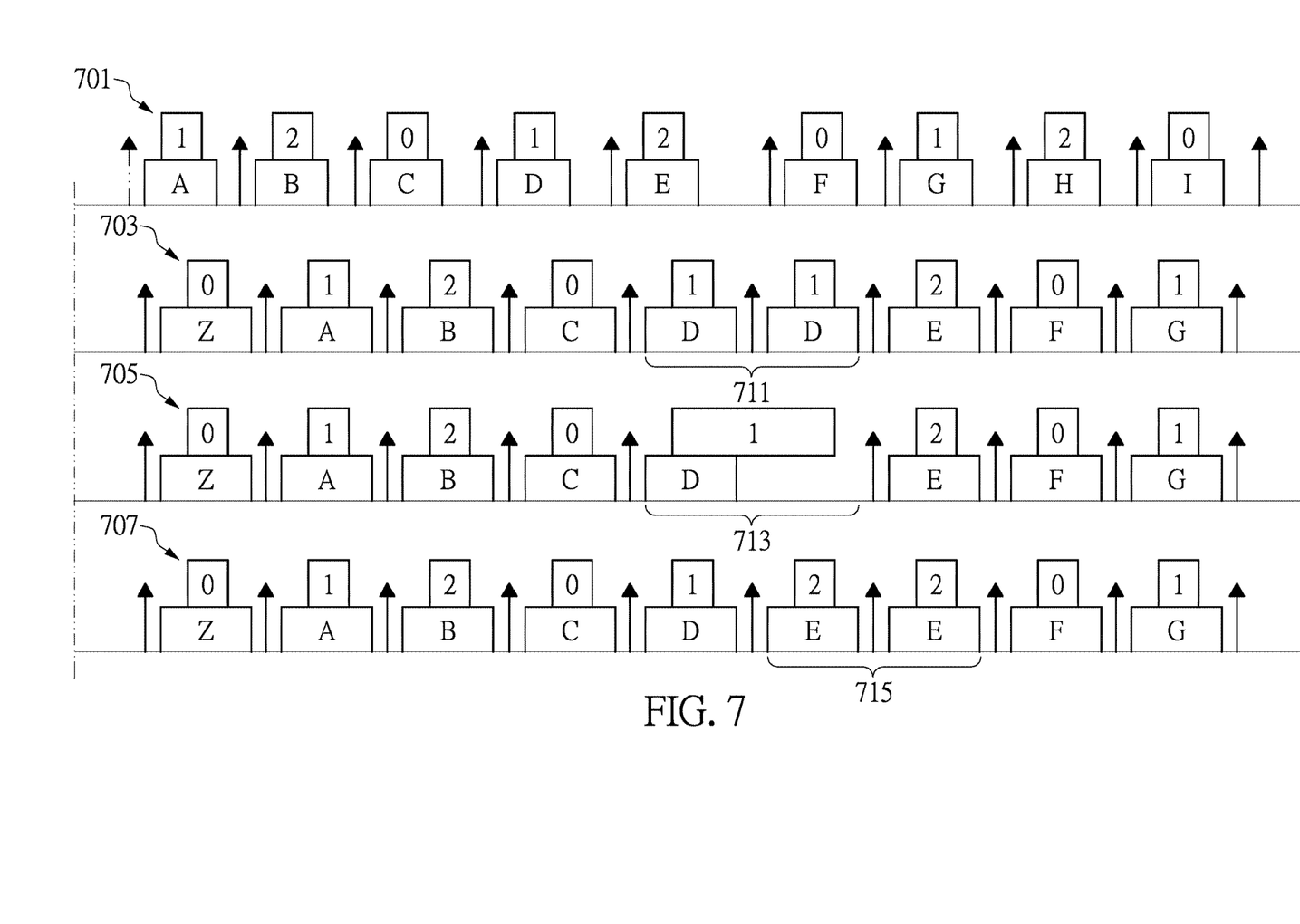
FIG. 7 is a timing diagram illustrating a time sequence of controlling operation of a read end according to a progress of writing frames into the buffer blocks of the write end in one embodiment of the present disclosure.

In view of the process shown in FIG. 6 for avoiding the problem of jump-back frames, reference next is made to FIG. 7, which is a timing diagram illustrating a time sequence of controlling operation of the read end according to a progress of writing data to the buffer blocks of the write end according to one embodiment of the present disclosure.

In the diagram, a writing timing 701 of the write end that acts as a master is shown. At the write end, the frame images are frame-by-frame and sequentially written to the multiple buffer blocks, i.e., in the diagram, a frame A is written to a buffer block 1, a frame B is written to a buffer block 2, a frame C is written to a buffer block 0, and so on, until a frame I is written to the buffer block 0.

At the read end, for avoiding the problem of jump-back frames since the buffer block that is not yet refreshed is repeatedly read, it is determined whether or not going on reading the buffer block based on whether the buffer block of the write end is refreshed. Whether or not the buffer block of the write end is refreshed can be checked, and particularly to check whether or not any new frame image is written to the buffer block based on a buffer index of the write end or by checking the vertical sync signals at the write end. In one of the exemplary examples, in a first read timing 703, the read end proceeds to read the buffer block based on a progress of writing data to the buffer block of the write end. For example, the read end reads the frame Z from the buffer block 0, reads the frame A from the buffer block 0, reads the frame B from the buffer block 2, reads the frame C from the buffer block 0, and then reads the frame D from the buffer block 1.

In the present example, referring to the write timing 701, the current progress of the write end is to write the frame E to the write buffer block 2 but not yet finished writing. It should be noted that, in accordance with the frame rate control mechanism, the read end selects a next buffer block 0 to be read for avoiding writing and reading the same buffer block, but the read end may read the frame C from the buffer block 0 that is not yet refreshed, so that the jump-back problem occurs. Reference is made to FIG. 6, which is a flowchart illustrating the method for reading and writing frame images with multiple buffer blocks according to one embodiment of the present disclosure, the read end can keep reading the buffer block (step S607), i.e., the read end keeps reading the frame D that is currently in the buffer block 1. As shown in the diagram of FIG. 7, the frame D kept in the buffer block 1 can be read twice in the timing 711. Therefore, the same frame image will be extended in an output video. The read end keeps reading the frame D from the buffer block 1 until it is checked that the frame E has been completely written to the buffer block 2 at the write end, and the read end then read the frame E from the buffer block 2. Accordingly, the video can therefore be outputted smoothly.

The second read timing 705 shows another example. The reading process performed on the previous frames is such as the above examples. The read end relies on the buffer index of the write end to proceed with the reading operation. Similarly, the frame Z is firstly read from the buffer block 0, the frame A is read from the buffer block 0, the frame B is read from the buffer block 2, the frame C is read from the buffer block 0, and the frame D is read from the buffer block 1.

In the meantime, in the write timing 701, the progress of the write end is to write the frame E to the buffer block 2, but not yet finished writing. As shown in step S607 of FIG. 6, when the write end does not change the buffer block to be written, the read end can be keep reading the buffer block. However, rather than the example of the first read timing 703, after the frame D is completely read from the buffer block 1 of the read end, the reading operation stops and therefore the frame D is read only once. As shown in the diagram, the original buffer block is kept at time 713, and a distance between the two adjacent vertical sync signals becomes longer. The output video can therefore extend the same frame, i.e., the frame D of the present example. In the meantime, it still checks the writing progress of the write end until the frame E has been written to the buffer block 2 completely. After that, the read end can continue to read the following frames, i.e., reading the frame E from the buffer block 2, so that the video can be outputted smoothly.

In a third read timing 707, as compared with the write timing 701, the read end sequentially reads the frame Z from the buffer block 0, the frame A from the buffer block 0, the frame B from the buffer block 2, the frame C from the buffer block 0, and the frame D from the buffer block 1. In the meantime, as shown in step S607 of FIG. 6, when it is checked that the buffer block of the write end is not yet refreshed, the read end keeps reading the buffer block that is currently read. Rather than the second read timing 705, the present example shows that the next frame is repeatedly read, i.e., the frame E that has been written to the buffer block 2 by the write end is repeatedly read. For example, the original buffer blocks being marked are kept at the time 715. Similarly, for avoiding the problem of jump-back frames, once the buffer block to be written is changed by the write end, the read end goes on reading the next frame.

Rather than the above-described problem of jump-back frames, in the video-processing system having multiple buffer blocks, the problem of inconsistent previous and following frames can be avoided in some special requirements such as repeatedly outputting the same frame for many times (e.g., more than twice or more). In the meantime, the input slow mode (i.e., having relatively high frame rate) is switched to the input fast mode (i.e., having relatively low frame rate) (i.e., the reading rate of the read end suddenly drops) during the system reads the multiple buffer blocks, the read end may read a different frame when it is required to repeatedly read the buffer block if the write end has refreshed the data in the buffer block. Accordingly, the problem of inconsistent previous and following frames may occur when the read end is required to repeatedly read the same frame. One of the solutions can refer to the flowchart shown in FIG. 8, in which the write end is controlled to write frames to the buffer blocks based on a progress of reading the buffer blocks of the read end that acts as a master. The present example mainly solves the problem of inconsistent previous and following frames that are repeatedly outputted, as shown in FIG. 4.

Figure 8:
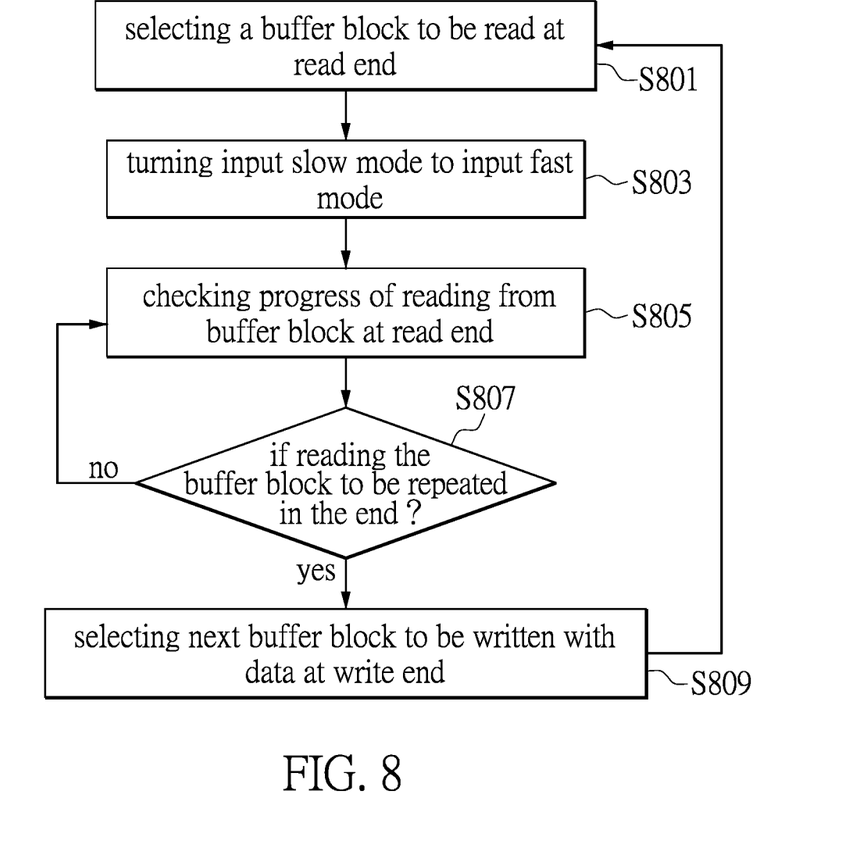
FIG. 8 is a flowchart illustrating the method for reading and writing frame images with multiple buffer blocks according to a second embodiment of the present disclosure.

Under a need of repeatedly outputting the same frame when a video is outputted, the read end selects the buffer block to be repeatedly read according to the buffer index of the write end under an original input slow mode (step S801). Suddenly, under certain circumstances (e.g., a frame rate is changed when playing a game), the input slow mode can be switched to the input fast mode (step S803). That means that the frames may need to be repeated when the frame rate of the write end becomes higher, and the write end can be controlled to be operated. The write end, through the video-processing system, can check the progress of the read end reading the buffer block (step S805).

In step S807, it is determined whether or not the read end reads the last buffer block that is required to be repeated read. If the read end does not read the last buffer block that is required to be repeated read (no), the system goes on checking the progress of the read end reading the buffer block (step S805). If the system checks that the read end has read the last buffer block that is required to be repeatedly read (yes), in the meantime the video-processing system drives the write end to select a next buffer block that is configured to write a next frame image, and goes on writing the data to the selected buffer block at write end (step S809). After that, the process goes back to step S801. If the system still operates under the input fast mode, the above steps are configured to be repeated for solving the problem of inconsistent previous and following frames when the system is required to repeatedly output the same frame.

Figure 9:
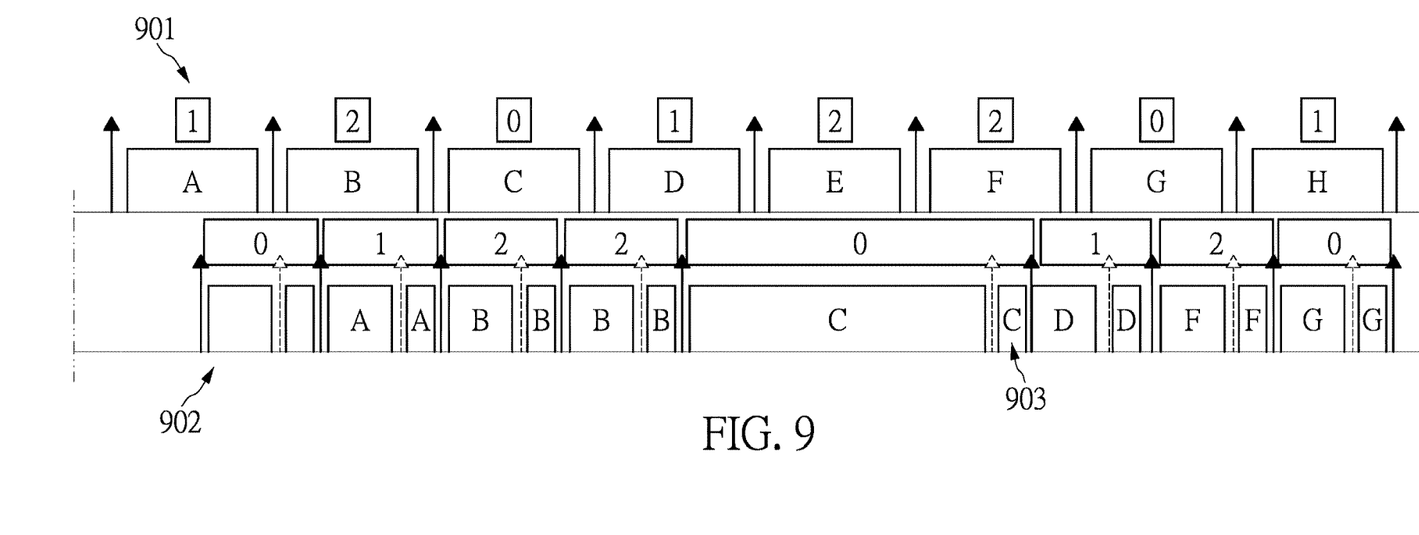
FIG. 9 is another timing diagram illustrating a time sequence of controlling operation of the write end according to a progress of reading frames from the buffer blocks of the read end in one further embodiment of the present disclosure.

As comparing with the process of solving the problem of inconsistent previous and following frames in FIG. 8, reference is made to FIG. 9, which is a timing diagram illustrating a time sequence of controlling the write end to operate according to the progress of the read end reading the buffer block in one embodiment of the present disclosure. The embodiment of FIG. 9 can also be compared with the timing diagram shown in FIG. 4, in which the problem of inconsistent previous and following frames occurs when a certain frame is required to be repeated outputted.

FIG. 9 is a timing diagram illustrating a time sequence of repeatedly outputting the same frame image in one embodiment of the present disclosure. A write timing 901 indicates that the write end sequentially writes continuous frame images to multiple buffer blocks. At the time for writing the frame images to the multiple buffer blocks, the read end relies on the buffer index of the write end to read the frame images from the buffer blocks. The read end may also be required to repeatedly read and output the same frame. The video-processing system can control the read end to repeatedly read the same frame image for many times through the vertical sync signals. In the present example, a vertical sync signal represented by a dotted line is inserted between two vertical sync signals represented by a solid line, which means reading and outputting the same frame image twice at a time.

However, when the system operates to switch the input slow mode to the input fast mode, the reading rate of the read end is suddenly slower than the write end. For avoiding the problem of inconsistent previous and following frames due to it is required to be repeatedly outputted, the video-processing system checks the progress of reading the buffer block by the read end, and controls the write end to select another buffer block to be written with a new data when the read end starts to read the last buffer block that is required to be repeatedly read.

Thus, through the solution described in FIG. 8, the read end can avoid the problem of repeatedly reading the same buffer block but a different frame image has been written to this buffer block. In view of the flowchart of FIG. 8, according to a read timing 902 shown in FIG. 9, when the frame C is read from the buffer block 0, and the data in the buffer block 0 is required to be repeatedly read, the write end should select a next buffer block to be written if the read end reads the last buffer block that is required to be repeated read. Therefore, the frame C can be read from the buffer block 0 again, i.e., the frame C shown in a repeat reading time 903 shown in FIG. 9.

In conclusion, for the video with a variable frame rate, the system that performs the method for reading and writing frame images with multiple buffer blocks can properly operate with a change between an input fast mode and an input slow mode. The problem of jump-back frames due to the variable frame rate when reading from or writing frame images to the multiple buffer blocks or the problem of inconsistent previous and following frames if a same frame is required to be repeated outputted may occur, the method for reading and writing frame images with multiple buffer blocks and the system are provided. According to the embodiment that solves the problem of jump-back frames, the read end determines whether or not to read a next buffer block based on a writing progress at the write end so as to avoid reading the buffer block that is not yet refreshed. According to the further embodiment that solves the problem of inconsistent previous and following frames, the write end determines the next buffer block to be written based on a reading progress at the read end so as to avoid reading the different frame image when the same frame is required to be read.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for reading and writing frame images, which is adapted to a video-processing system that includes a write end and a read end having multiple buffer blocks wherein, when the video-processing system checks that a read rate of the read end suddenly drops, a frame rate of the write end becomes higher, the reading rate of the read end is suddenly slower than a write rate of the write end, the video-processing system is switched from an input slow mode to an input fast mode, or is switched from the input fast mode to the input slow mode, the method comprises:
   a. when the video-processing system checks that a progress of the write end is writing a frame to one of the multiple buffer blocks but the frame is not written to the buffer block completely, the read end is controlled to continuously read the frame that is currently reading from another buffer block until the video-processing system checks that the write end already writes the frame to the buffer block completely, and then the video-processing system controls the read end to read the frame that is completely written by the write end to the one of the multiple buffer blocks; or
   b. when the video-processing system checks that the progress of the write end is writing the frame to the one of the multiple buffer blocks but the frame is not written to the buffer block completely, the read end is controlled to keep reading the frame that is currently reading from another buffer block until the read end reads the frame completely; the read end is again controlled to start reading another frame from one of the multiple buffer blocks when the write end has written the frame to the buffer block completely; or
   c. when the video-processing system checks that the write end does not change the buffer block to be written with the frame, the read end is controlled to repeatedly read the frame that the write end has written to the one of the multiple buffer blocks;
   and the read end is again controlled to continue to read a next frame when the written end changes the buffer block to be written with one of the frames.

2. The method according to claim 1, wherein, in the video-processing system, the write end and the read end are implemented by a circuitry or software, and the write end and the read end respectively connect with a memory that implements the multiple buffer blocks.

3. The method according to claim 1, wherein, when the video-processing system acknowledges that an audiovisual source of a video adopts a variable refresh rate, jump-back frames are detected in response to the input fast mode being switched to the input slow mode due to the refresh rate is not a constant.

4. The method according to claim 1, wherein when the input slow mode is suddenly switched to the input fast mode due to a read rate of the read end drops suddenly, the video-processing system checks the progress of the read end reading the frame in one of the multiple buffer blocks so as to control the write end to write a new frame to another buffer block when the write end waits for the read end starting to read the same frame from the one of the multiple buffer blocks.

5. The method according to claim 1, wherein, under a condition of accessing the frame image with the multiple buffer blocks, frame rate control for writing and reading different buffer blocks is divided to the input fast mode and the input slow mode; wherein, under the input slow mode, the write end selects the buffer block to be written in a fixed order and the read end selects the buffer block to be read according to a buffer index of the write end; and, under the input fast mode, the read end selects the buffer block to be read in a fixed order and the write end selects the buffer block to be written according to another buffer index of the read end.

6. The method according to claim 5, wherein the read end relies on the buffer index of the write end to determine a progress of accessing the buffer blocks by the write end.

7. The method according to claim 6, wherein, in the video-processing system, the write end and the read end are implemented by a circuitry or software, and the write end and the read end respectively connect with a memory that implements the multiple buffer blocks.

8. The method according to claim 1, wherein the progress of accessing the multiple buffer blocks by the write end or the read end is determined through a vertical sync signal at the write end or the read end.

9. The method according to claim 8, wherein the video-processing system controls the read end to repeatedly read a same frame image by the vertical sync signals.

10. The method according to claim 9, wherein, in the video-processing system, the write end and the read end are implemented by a circuitry or software, and the write end and the read end respectively connect with a memory that implements the multiple buffer blocks.

11. A system performing a method for reading and writing frame images according to claim 1, wherein the system comprises:
the video-processing system that includes the write end and the read end for accessing the multiple buffer blocks.

12. The system according to claim 11, wherein, in the video-processing system, the write end and the read end are implemented by a circuitry or software, and the write end and the read end respectively connect with a memory that implements the multiple buffer blocks.

13. The system according to claim 12, wherein the video-processing system includes a frame rate controller for controlling operations of writing and reading each of the frame images of the video into the multiple buffer block and performing frame rate conversion.

14. The system according to claim 11, wherein, when the video-processing system acknowledges that an audiovisual source of a video adopts a variable refresh rate, jump-back frames are detected in response to the input fast mode being switched to the input slow mode due to the refresh rate is not a constant.

15. The system according to claim 11, wherein, when the input slow mode is suddenly switched to the input fast mode due to a read rate of the read end drops suddenly, the video-processing system checks the progress of the read end reading the frame in one of the multiple buffer blocks so as to control the write end to write a new frame to another buffer block when the write end waits for the read end starting to read the same frame from the one of the multiple buffer blocks.

16. The system according to claim 11, wherein the read end relies on a buffer index of the write end to determine a progress of accessing the buffer blocks by the write end.

17. The system according to claim 11, wherein the progress of accessing the multiple buffer blocks by the write end or the read end is determined through a vertical sync signal at the write end or the read end.

18. The system according to claim 17, wherein the video-processing system controls the read end to repeatedly read a same frame image by the vertical sync signals.

19. The system according to claim 18, wherein, in the video-processing system, the write end and the read end are implemented by a circuitry or software, and the write end and the read end respectively connect with a memory that implements the multiple buffer blocks.

20. The system according to claim 19, wherein the video-processing system includes a frame rate controller for controlling operations of writing and reading each of the frame images of the video into the multiple buffer block and performing frame rate conversion.

* * * * *